United States Patent [19]

Frantz

[11] 4,052,178

[45] Oct. 4, 1977

[54] COMPRESSED AIR FILTER ASSEMBLY

[75] Inventor: Virgil L. Frantz, Salem, Va.

[73] Assignee: Graham-White Sales Corporation, Salem, Va.

[21] Appl. No.: 609,392

[22] Filed: Sept. 2, 1975

[51] Int. Cl.² .......................................... B01D 45/16
[52] U.S. Cl. ................................... 55/212; 55/218; 55/269; 55/313; 55/337; 55/385 R; 55/417; 55/418; 55/432; 55/DIG. 17; 137/198; 137/204; 137/545
[58] Field of Search ................. 55/184, 185, 191, 195, 55/200, 201, 212, 213, 218, 267, 269, 312, 313, 314, 319, 320, 337, 392, 394, 395, 397, 399, 417, 420, 423, 424, 426, 432, 456, 457, DIG. 17, 418, 163, 385 R; 137/204, 544, 545, 198, 538, 540

[56] References Cited

U.S. PATENT DOCUMENTS

| 1,461,045 | 7/1923 | Paasche | 55/319 |
|---|---|---|---|
| 1,920,066 | 7/1933 | De Lancey | 55/185 X |
| 2,016,541 | 10/1935 | Campbell | 55/312 X |
| 2,096,484 | 10/1937 | Farmer | 55/424 X |
| 2,273,152 | 2/1942 | Sonntag | 137/540 X |
| 2,645,062 | 7/1953 | Senesky | 137/544 X |
| 2,676,782 | 4/1954 | Bostock et al. | 137/540 X |
| 2,706,995 | 4/1955 | May | 55/DIG. 17 |
| 2,864,461 | 12/1958 | Dueker | 55/213 |
| 2,900,043 | 8/1959 | Johlin et al. | 55/313 |
| 3,000,396 | 9/1961 | Davis | 137/538 X |
| 3,402,529 | 9/1968 | Frantz | 55/267 |
| 3,464,186 | 9/1969 | Hankison et al. | 55/185 X |
| 3,472,000 | 10/1969 | Glass et al. | 55/163 |
| 3,516,231 | 6/1970 | George | 55/267 |
| 3,559,764 | 2/1971 | Wheeler, Jr. | 55/337 X |
| 3,841,064 | 10/1974 | Hitchiner et al. | 55/417 X |

FOREIGN PATENT DOCUMENTS

| 952,229 | 11/1956 | Germany | 55/417 |
|---|---|---|---|

Primary Examiner—Frank W. Lutter
Assistant Examiner—David L. Lacey
Attorney, Agent, or Firm—Wilmer Mechlin

[57] ABSTRACT

An assembly connectable between a compressor and reservoir, having a filter unit capable of centrifugally cooling and separating condensed moisture and other contaminants from compressed air and discharging clean air in saturated condition at the outlet temperature and pressure, the unit being connected to the compressor through an inlet valve opening when the compressor begins pumping and to the reservoir through a pressure regulator valve adjustable to open only when the air in the unit reaches a predetermined pressure, which, for minimizing the absolute moisture content of the clean air passed to the reservoir, usually will be substantially maximum reservoir pressure.

15 Claims, 3 Drawing Figures

COMPRESSED AIR FILTER ASSEMBLY

BACKGROUND OF THE INVENTION

Heretofore, as shown in Frantz U.S. Pat. No. 3,890,122, issued June 17, 1975, filter units in compressed air systems have passed air to a reservoir usually through an outlet check valve or sometimes through an unvalved outlet line, the latter if the unit is open to atmosphere only briefly during the compressor's idling cycle. In either case, the objective is to prevent the reservoir from losing pressure through the filter unit when the compressor is not pumping. Unless the ambient air is exceptionally dry or the filter unit contains a desiccant, the air will be saturated or even super-saturated with moisture on both entering the leaving the unit, although the outgoing air will have a lower absolute moisture content, if, as in the Frantz patent, the filter unit is adapted to remove moisture other than by adsorption.

The problem posed by a filter unit of the non-desiccant type in passing at least saturated air to a reservoir, whether through a check valve or an unvalved outlet, is that the resistance to flow is substantially or entirely the back pressure from the reservoir. In turn, the compressor, through a governor, is responsive in its pumping and idling cycles to reservoir pressure, idling when the reservoir reaches a predetermined maximum or cutout pressure and beginning to pump at a predetermined minimum or cut-in reservoir pressure and continuing to pump until the pressure in the reservoir is again at maximum. Thus, during the pumping cycle, the saturated air passing from the filter unit will range in pressure from at or slightly above the minimum to the maximum reservoir pressure. The absolute moisture content of saturated air decreasing with increasing pressure, the inevitable result is that, when the reservoir is fully charged to its maximum pressure, the air in the reservoir will be super-saturated, to the detriment of air brakes or other equipment operated by reservoir pressure. It is with a solution of this problem that the present invention is primarily concerned.

SUMMARY OF THE INVENTION

The primary object of the present invention is to provide an improved compressed air filter assembly whereby super-saturation of the air with which a reservoir is charged through the assembly is made avoidable by combining filter means depending on cooling for removing moisture from the air with outlet pressure regulator valve means adjustable to predetermine the pressure at which air is passed from the filter means to the reservoir.

Another object of the invention is to provide a compressed air filter assembly adapted by centrifugal action to cool and separate moisture and other contaminants from compressed air and not only regulated in the pressure at which it can pass air to a reservoir but protected by a normally open inlet valve automatically closing at the end of the compressor's pumping cycle from receiving and being heated by hot air from the compressor during the compressor's idling cycle.

An additional object of the invention is to provide a compressed air filter assembly having, as outlet valving for a filter unit, a pressure regulator valve finely adjustable to open within a predetermined narrow pressure range and only in response to pressure in the filter unit, for preventing the unit from passing filtered air to a reservoir except when the air in the unit is at substantially maximum reservoir or other predetermined pressure.

A further object of the invention is to provide a compressed air filter assembly having a filter unit for centrifugally cooling and separating moisture and other contaminants from compressed air from a compressor, wherein the effectiveness of the assembly in cooling is increased by admitting air through inlet valving only during the compressor's pumping cycle and leading the air from the inlet valving to the filter unit through a preliminary centrifugal cooling unit surmounting and heat-insulated from the filter unit and mounting the inlet valving.

Another object of the invention is to provide a compressed air filter assembly, wherein a filter unit operative during a compressor's pumping cycle for separating contaminants from compressed air, drains contaminants through a normally closed, then open drain valve during the compressor's idling cycle and has capacity for storing during the pumping cycle sufficient air to purge the unit draining of any collected or entrapped contaminants.

Other objects and features of the invention will appear hereinafter in the detailed description, be particularly pointed out in the appended claims and be illustrated drawings, in which:

FIGURE DESCRIPTION

DETAILED DESCRIPTION

Figure 1:
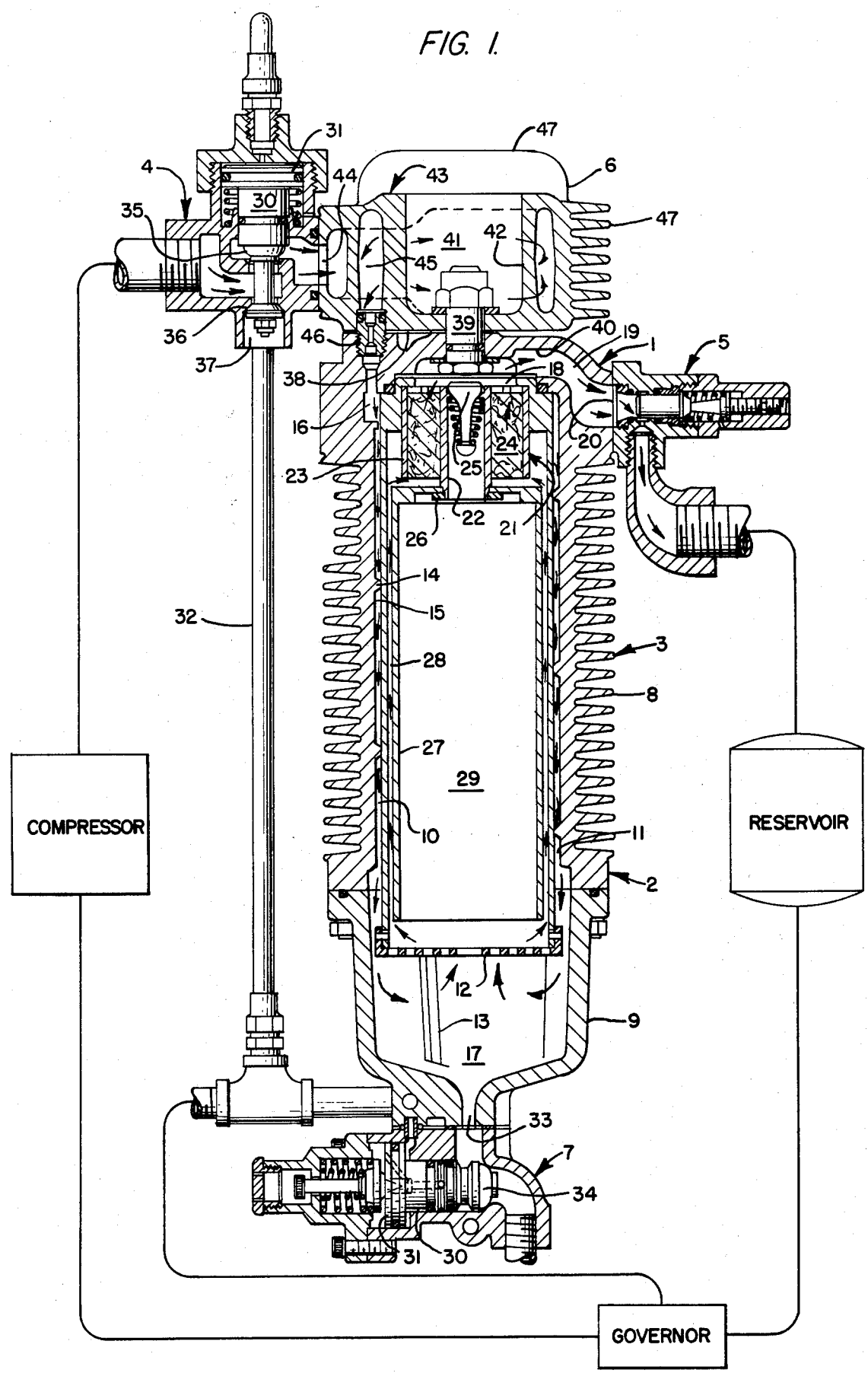
FIG. 1 is a view of a preferred embodiment of the improved compressed air filter assembly of the present invention and the associated components with which it usually is installed, the assembly being shown in central vertical section and the components schematically.

Referring now in detail to the drawings in which like reference characters designate like parts, the improved compressed air assembly of the present invention, while adapted for use in other compressed air systems in which super-saturated reservoir can adversely affect the operating characteristics or service lift of air-operated equipment, in its preferred embodiment is particularly designed for use in compressed air systems of vehicles, such as trucks, buses and rapid transit cars, and will be so described as exemplary of the invention.

As indicated schematically in FIG. 1, the improved filter assembly, designated as 1, is designed to be installed in a compressed air system between a compressor and a reservoir. The assembly 1 is comprised of a filter unit 2 having a housing 3 in which contaminants are separated from compressed air received from or supplied by the compressor before being passed as filtered air to the reservoir, an inlet valve 4 and an outlet pressure regulator valve 5 on opposite or inlet and outlet sides of the housing, an initial or preliminary cooling unit 6 surmounting and hear-insulated from the housing and suitably mounting the inlet valve, and a drain valve 7 preferably mounted on and suspended from the bottom of the housing.

Conventionally, the compressor, under control of a governor, alternates between pumping and idling cycles in response to predetermined minimum or cut-in and maximum or cut-out pressures in the reservoir, pumping whenever the reservoir pressure is between minimum and maximum and idling while the pressure is at maximum. The preferred filter unit 2, in turn, responds automatically to the condition of the compressor, cooling and separating contaminants from the compressed air during the pumping cycle and draining the separated contaminants through the drain valve 7 during the idling cycle.

Upright and generally cylindrical, the housing 3 is divided vertically into an externally finned upper part 8 and a lower part 9 removable attached, as by bolting, to the upper part. A suitably cylindrical central bore 10 in the upper part 8 slidably receives or seats a correspondingly cylindrical canister or cartridge 11 having at the bottom a removable foraminous cap or cover 12 resting or supported on internal vertical ribs 13 in and instanding radially from the side of the lower part 9. The canister 11 is laterally or radially spaced from the housing's upper part 8 by a continuous helical rib or baffle 14, conveniently integral or rigid with and instanding from the housing 3 and defining with confronting sides or surfaces of the housing and canister a downwardly directed or extending helical air passage 15. Leading from an inlet passage 16 in the upper portion of the housing 3, through which hot, dirty air is introduced or injected during the compressor's pumping cycle, to a sump 17 in the lower part or bottom bowl 9, the helical passage 15 causes or forces the injected air to flow cyclonically downwardly therethrough, in process centrifugally cooling the gas and separating heavier contaminants therefrom.

The canister 11 has in its upper end a central outlet or opening 18 opening onto an outlet passage 19 in the upper end portion of the housing 3 and, therethrough, to the housing's outlet port 20 and the outlet pressure regulator valve 5. Suitably sealed against the housing 3 about the outlet 18 for blocking the injected air in the inlet passage 16 from bypassing the helical passage 15, the canister 11 preferably contains or encloses in its upper end portion a filter element 21, which most suitably is a scrubber having around a central tube 22 of a foraminous-topped, open-bottomed casing or container 23, a pad 24 of stainless steel wool for entrapping or physically filtering oil droplets or like particles not previously removed from the air. With its casing 23 pressfitted or otherwise suitably fixed in position in the canister 11 and a relief valve 25 in its central tube 22 for bypassing the pad 24 in case the latter becomes clogged, the scrubber 21, by downwardly extending and externally threading the extended part of the tube to receive a nut 26, is enabled to mount or suspend therebelow within the canister 11 an inner canister or shell 27. Open at the bottom but closed at the top except in registry with the central tube 22, the inner canister 27 is spaced at the side radially or laterally inwardly from the confronting side of the outer or main canister 11 to form between confronting sides thereof a vertically extending annular passage 28 for passing air from the sump 17 to the scrubber 21. Of much larger volume than the relatively narrow passages 15 and 28, the open-bottomed hollow interior of the inner canister 27 serves as a storage chamber 29 of relatively large capacity for storing during the compressor's pumping compressed air for powering the draining or discharge of separated or filtered contaminants when the drain valve 7 next opens.

The automatic response of the filter assembly 1 to the condition of the compressor in filtering during the pumping cycle and draining during the idling cycle, is the function or result of the combined or concerted action of the inlet valve 4 and drain valve 7. In terms of either the pumping cycle of the compressor or their own unactuated conditions, the inlet valve 4 is normally open and the drain valve 7 normally closed. If, as preferred, the valves are actuated by air rather than electrically, each suitably will have as its valve member a differential piston 30 spring-held or pressed in normal position and shiftable to its alternate position by actuating air applied to the piston's large head 31. For simultaneous actuation out of or back to normal position or condition, in synchronism with a cycle change of the compressor, the compressed air for both of the valves 4 and 7 suitably is air diverted to and circulating in the system's governor line when the compressor is caused by the governor to idle, the actuating air conveniently being applied simultaneously to both valves through connecting piping 32.

Connected to the sump 17 through a drain port 33 in the bottom of the housing 3, the preferred drain valve 7 has on its piston 30 a single, normally seated, small head or valve element 34. When used with a compressor equipped with an aftercooler, the inlet valve 4 also should be a single-seated valve, with a single, normally unseated, small head or valve element 35 seated during the idling cycle for blocking both dumping of the aftercooler and flow of hot, low pressure air into the filter unit 2. However, for compressors not having aftercoolers, the preferred inlet valve 4 is double-seated, with a second small head 36 spaced from the first head 35 and alternately seatable for normally closing a downwardly directed exhaust port 37 in the bottom of the valve through which hot air from the idling compressor is exhausted to atmosphere and its heat dissipated.

Whether or not the associated compressor is equipped with an aftercooler, the filter assembly 1, for increasing its effectiveness in cooling the hot dirty air received from the compressor during the latter's pumping cycle and removing moisture therefrom by condensation, preferably includes for additional cooling capacity the preliminary, initial or pilot cooling unit 6. Interposed between the filter unit 2 and inlet valve 4 to act on the injected air at the latter's highest temperature, the cooling unit 6 desirably surmounts or is mounted on the top of the filter unit 2 and heat-insulated therefrom by an intervening, thermally insulating gasket 38. Releasably attached to the filter unit 2, as by a connecting or mounting bolt 39 centered on the housing 3 and extending upwardly through and fluid-sealed within the top wall 40 thereof, the preliminary or auxiliary cooling unit 6 in turn conveniently mounts the inlet valve 4. As does the filter unit 2 in the helical passage 15, the preferred cooling unit 6 depends on centrifugal cooling from cyclonic or vortical flow induced from the compressed air's own impetus or kinetic energy, for partly cooling the hot, dirty air from the compressor during the pumping cycle before the air is passed or admitted to the cooling unit. For the purpose, the preferred cooling unit 6 has an upwardly opening central cavity 41 surrounded by an annular or generally cylindrical side wall 42 of the unit's substantially cup-shaped body 43. At one side the cooling unit has an inlet port 44 opening outwardly onto the inlet valve 4 and inwardly onto the inlet end of a suitably one or unilevel, single coil or loop, spiral passage 45, whose outlet end opens through an axially ported or apertured plug 46 connecting the body and housing 3, onto the housing's inlet passage 16. Heat from the air passing through the cooling unit 6 is dissipated to ambient air partly through the inside of the side wall 42 and the area exposed at the bottom of the body 43, but mainly through external fins 47 on the body's top and sides.

Although the primary function of the cooling unit 6 is to partly cool the air from the compressor in advance of the filter unit 2, there will usually be some condensation of moisture and separation of heavier contaminants incident to the centrifugal cooling. With the ported plug 46 at a low point of the spiral passage 45, any such separated moisture and other contaminants will flow downwardly through the plug and inlet passage 16 to the helical passage 15 in the filter unit 2 in which the assembly 1 performs or conducts its main or principal stage of centrifugally cooling and separating or filtering condensed moisture and other contaminants from the initially hot, dirty air received when the compressor is pumping. On passing from the helical passage 15, the separated contaminants will collect in the sump 17, while the now relatively cool and clean air will have its cyclonic flow broken up or interrupted by the internal vertical ribs 13 and, reversed in direction, flow upwardly with some further cooling through the annular passage 28 around the inner canister 27 to the scrubber 21 for filtering or removal by entrapment of remaining oil droplets or like particles. With the assembly's cooling and cleaning or filtering now completed, the cool, clean air, on reaching the outlet port 20, will be at a temperature approximating ambient and reduced in absolute moisture content to saturation at the temperature and pressure prevailing in that part of the housing 3.

Were the outlet valving of the assembly 1 a conventional check valve, backflow of air from the reservoir to the filter unit 2 would be blocked during the compressor's idling cycle, but the valving would open to pass air to the reservoir during the pumping cycle at a pressure only slightly higher than the reservoir's minimum pressure. The outlet pressure regulartor valve 5 of this invention does act as a check valve during the idling cycle in blocking backflow of air from the compressor, but, by contrast with conventional outlet valving, it also is adapted to prevent flow of cool filtered air to the reservoir during the pumping cycle until and unless the air in the filter unit 2 is at a predetermined pressure which preferably is the reservoir's maximum.

The preferred outlet pressure regulator valve 5 has a two-part body 48 formed of a base or main part 49 and cap or outer part 50, with an axial, mainly cylindrical bore 51 extending therethrough. Externally generally cylindrical, the body 48 is attached to a side of the housing 3, as by bolting through a wing flange 52 integral with the base 49. When attached, the body 48 covers the outlet port 20 of the housing 3 and has an inlet 53 at the inner end of the axial bore 51 open to and aligned with the outlet port and is suitably gasketed for sealing between itself and the housing about its own inlet and the the housing's outlet port. The cap 50 is screwed into the outer end of the base 49 and, for that purpose, conveniently has between its ends an integral, hex-sided, radially outstanding, annular boss 54, which also serves as a stop to limit the cap's penetration into the base.

Figure 2:
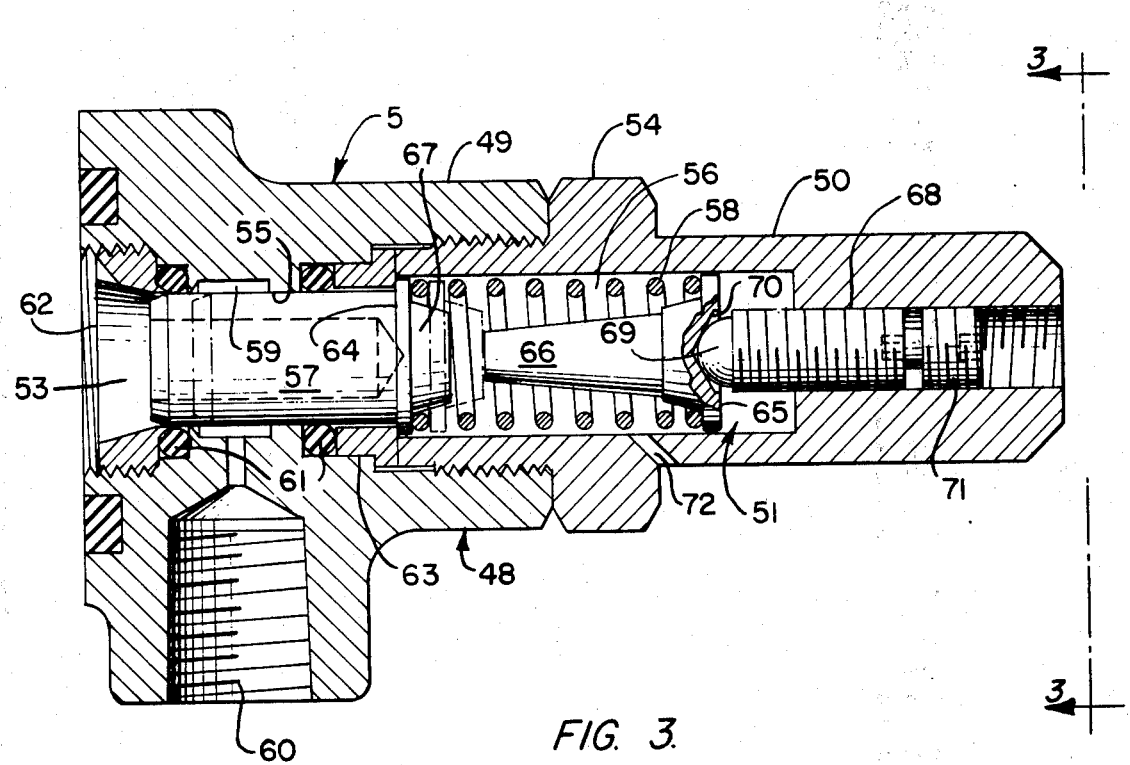
FIG. 2 is a view on the section of FIG. 1 and an enlarged scale of the outlet pressure regulator valve removed from the remainder of the assembly.
Figure 3:
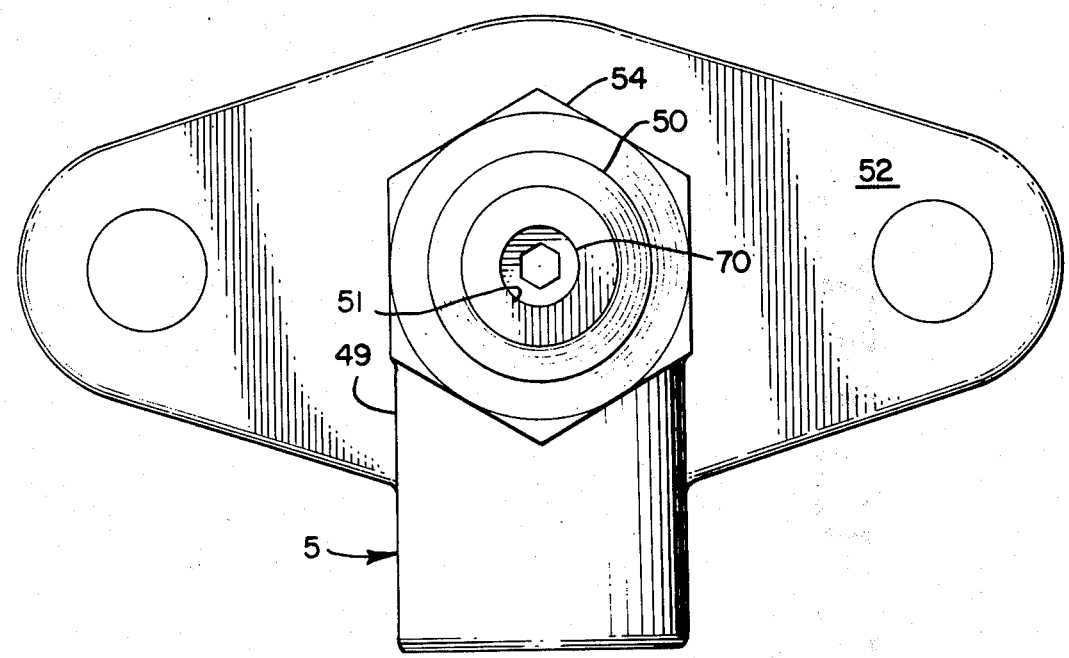
FIG. 3 is an end elevational view taken along lines 3—3 of FIG. 2.

Outwardly of the inlet 53, the axial through-bore 51 is divided axially or longitudinally intermediate its ends into adjoining or contiguous, smooth-walled valve and spring chambers or compartments 55 and 56, respectively, the former in the base 49 and the latter in the cap 50. The valve's valve element, in the form of a shuttle or floating piston 57, is slidable or shiftable axially or longitudinally in the valve chamber 55 between the closed and open positions shown in FIG. 2 in solid and dot-and-dash lines, respectively. Shifting in opening under force of air pressure in the inlet 53 against the yieldable resistance of a preferably coil return spring 58, the shuttle 57 in open position connects the inlet through an annular groove or channel 59 surrounding or encircling the valve chamber 55, to a side or bottom outlet 60 in the base 49 and thence, through suitable piping, to the reservoir, as shown schematically in FIG. 1. For sealing against leakage past the shuttle 57 in either of its positions, the shuttle is sealingly engaged by the outer and alternately engaged and disengaged by the inner of a pair of longitudinally or axially spaced O-rings 61 seated in the base 49 about the valve chamber 55, with the inner held in place by an end-notched nut 62 and the outer by the cap 50 and an interposed bushing 63.

In yieldably resisting opening movement of the shuttle 57, the return spring 58 seats at opposite ends against and acts between an annular flange or head 64, integral with and radially outstanding from the outer end portion of the shuttle in the spring chamber 56 and a reactance in the form of a spring follower 65. In and adjustably, variably or selectively positionable, axially or longitudinally of the spring chamber 56, the spring follower 65, inside the spring 58, has or carries, as a fixed or integral inner part, a suitably frusto-conical, inwardly tapered spacer or stop 66. Projecting inwardly toward and normally spaced from but engageable with an outwardly projecting abutment 67 on the outer end of and integral with the shuttle 57, the spacer 66, for any position of the follower, determines the limits of the outward movement of and compression of the spring 58 by the shuttle 57, the inward limit of movement of which is fixed by engagement of the flange 64 with the bushing 63.

For adjusting the position of the spring follower 65, the outer end portion of the axial bore 51 is threaded for receiving an adjusting screw 68, suitably having a ball-shaped inner end 69 seating in a conical socket 70 in the outer or confronting end of the follower. With the spring 58 acting outwardly on the spring follower 65, turning of the adjusting screw 68 in or out will shift the follower toward one or the other end of the spring chamber 56 and correspondingly vary the normal spacing between the spacer 66 of the follower and the confronting end of the shuttle 57. Once an adjustment has been made, the adjusting screw 68 is held against backing off and thus in selected position or setting by a set screw 71. To guard against accidental disturbance of or tampering with an adjustment, both of the screws 68 and 71 preferably are contained within the bore 51 after an adjustment and fitted in their outer ends for turning by a special tool, such as a socket wrench.

The resistance to compression of a coil spring, such as the preferred spring 58, increases substantially in direct proportion to the extent of compression or shortening of the spring, after a relatively low-resistance initial compression from free height. With the spring follower 65 adjustably positionable in the spring chamber 56 for both precompressing the spring 58 and predetermining the extent of its compression between the open and closed positions of the shuttle 57 and the spring of suitable strength and free height, the pressure regulator valve 5 is adapted to regulate within close or narrow limits the pressure required in the filter unit 2 before the valve will pass filtered compressed air to the reservoir. Back pressure in the spring chamber 56 is eliminated as a factor in the pressure regulation by connecting that chamber to atmosphere through a bleed port 72 in the side of the cap 50.

Almost invariably, the hot dirty air from a compressor is at least saturated with moisture and, unless incorporating either a dehydrating or a refrigerating agent or means, a compressed air filter, regardless of its efficiency in removing excess moisture by condensation, even theoretically cannot reduce the temperature of the air it discharges below ambient of the air's moisture content below saturation at the discharging pressure. Practically, filters not incorporating either of such agents, herein sometimes termed "filters on the non-desiccant type" or "non-desiccant filters", have heretofore been incapable of cooling air to a temperature approaching ambient and have left the reservoir, when fully charged, super-saturated with moisture, to the detriment of devices operated by reservoir air. However, the outlet pressure regulator valve 5, given a filter capable of discharging air reduced in moisture content to saturation and approaching ambient in temperature, can hold the moisture content of the air in the reservoir to and even below saturation.

The absolute moisture content of saturated air increases with increase in temperature and decreases with increase in pressure. Thus, absent a substantial intervening temperature drop, a filter passing saturated compressed air to a reservoir only when the air is at or above maximum reservoir pressure, will cause the air in the compressor, when fully charged, to be at most saturated and, if the passing pressure is above maximum reservoir, to be unsaturated due to the expansion of the air in the lesser pressure of the reservoir. In the truck, bus and rapid transit car installations for which the illustrated filter assembly 1 is particularly designed, the usual minimum and maximum reservoir pressures are, respectively, about 104.7 p.s.i.a. (7.31 kg.s.cm.a.) and 134.7 p.s.i.a. (9.47 kg.s.cm.a.).

Adjustable within narrow limits in the pressure at which it will open, the pressure regulator valve 5 preferably is preset or predetermined to pass filtered air from the filter unit 2 at substantially maximum reservoir pressure, the term "substantially", as here used, denoting a pressure in a preferred range from maximum reservoir up to about 10 p.s.i. (0.70 kg.s.cm.) thereabove. A sudden drop in ambient temperature when the compressor is idling, could produce a super-saturated condition in the air in the reservoir, but, unless the drop is drastic and protracted, this is unlikely, since the temperature within the reservoir is slow to respond to change and intervening pumping from the cooler air would negate it. As opposed, a filter equipped with an outlet check valve in the conventional manner, would begin to pass at least saturated air to the reservoir at only slightly above reservoir minimum and continue to pass air at progressively increasing pressure until reservoir maximum was finally reached, with the inevitable result that the air in the reservoir, when fully charged, would be super-saturated. Although the pressure regulator valve 5 does increase the amount of moisture condensed in forcing the air in the filter unit to reach and be at a predetermined maximum before it can pass to the reservoir, other components of the assembly 1 and particularly the filter unit 2, inlet valve 4 and preliminary cooling unit 6 are otherwise responsible for and together capable of delivering filtered air to the outlet port 20 at a temperature closely approaching ambient and with its moisture content reduced to saturation at the outlet temperature and pressure. The burden of cooling and filtering the hot dirty air received from the compressor during the pumping cycle falls principally upon the filter unit 2, in which air is centrifugally cooled and heavier contaminants separated or filtered in the helical passage 15, excess moisture is condensed in that passage and the sump 17, with some further cooling in the bottom bowl 9 and annular passage 28, and oil and like droplets are filtered or trapped in the scrubber 21. The preliminary cooling unit 6 furnishes additional centrifugal cooling and some separation of contaminants, with its effect on the overall cooling enhanced by the heat insulation of its body 43 from the housing 3.

The third component, the inlet valve 4, in automatically closing at the start of the compressor's idling cycle, preferably in response to governor line pressure, blocks entry into the cooling and filtering units 6 and 2 of hot air from the idling compressor at a pressure too low for effective centrifugal cooling. As a result, there is no heat build-up from that source in the body 43 and housing 3, which the assembly 1 otherwise would have to dissipate in its next filtering cycle, with consequent reduction in its cooling efficiency over at least the early part of that cycle. Additionally, when the assembly is used with a compressor not having an aftercooler, the valve 4 will have the illustrated alternately opening exhaust port 37 and be able to dissipate the heat of the hot air by exhausting the air to atmosphere through the then open port, at the same time, by enabling the air to flow therethrough, preventing heat from building up in the valve itself and the supply line leading to it from the compressor.

In operation, the filter assembly 1 is automatically synchronized in its filtering and draining cycles with the pumping and idling cycles, respectively, of the compressor, by the automatic simultaneous change or shift to and from normal condition in response, respectively, to the forces of their own return springs and to governor line pressure, of the normally open inlet valve 4 and normally closed drain valve 7. With no pressure then in the governor line and the inlet valve 4 thus open and the drain valve 7 closed, the assembly 1, throughout the pumping cycle, receives hot dirty air from the compressor, cools and filters the air in the cooling and filter units 6 and 2 and passes cool filtered air in moisture-saturated condition to the reservoir, but only when the air in the filter unit is at the predetermined, preferably substantially maximum reservoir pressure at which the outlet pressure regulator valve 5 has been preset to open.

The pumping cycle of the compressor and filtering cycle of the filter assembly 1 continue until the reservoir is fully charged with air at maximum reservoir pressure. On sensing that cut-out condition, the governor shifts the compressor from its pumping to its idling cycle, in process diverting pressure to the governor line. At the start of the idling cycle, there is simultaneous automatic closing of the inlet valve 4 and opening of the drain valve 7, both in the preferred embodiment in response to governor line pressure. Since the pressure regulator valve 5, acting as a check valve, always blocks reverse flow from the reservoir to the filter unit 2, the filter and cooling units 2 and 6 are then cut off from both the compressor and the reservoir and open only to atmosphere through the drain valve 7 and this condition obtains for the duration of the idling cycle.

In truck, bus and like installations, the compressor will continue to idle until the demands of operating equipment for compressed air have reduced the air pressure in the reservoir to reservoir minimum and, depending on road conditions, the idling cycle may vary from as little as about 25 seconds to over 2 hours, as opposed to an average pumping cycle of about 45 to 55 seconds. But however short the idling cycle, the time required to discharge or drain contaminants from the filter unit 2 is far shorter. The driving force is the compressed air in the filter unit when the drain valve 7 opens that was stored in the unit during the pumping cycle. With the large volume of the chamber 29 available for such storage, the effect of opening the drain valve 7 is to release to atmosphere an air blast of such force as not only to drive out through the exhaust port 33 contaminants collected in the sump 17 but also by suction to purge the scrubber of any contaminants it trapped during the filtering. The filter unit 2 will exhaust air until its interior pressure is reduced to atmospheric and this is the duration of the draining cycle, a matter usually of a second or less given ample openings in the exhaust port and the drain valve.

From the above detailed description it will be apparent that there has been provided in improved compressed air filter assembly which is adapted to pass to a reservoir filtered air reduced in moisture content to saturation and in temperature approximately to ambient, but only when the air is at substantially maximum reservoir or other predetermined pressure. It should be understood that the described and disclosed embodiment is merely exemplary of the invention and that all modifications are intended to be included that do not depart from the spirit of the invention and the scope of the appended claims.

We claim:

1. A filter assembly for a compressed air system having a reservoir and a compressor responding in pumping and idling cycles respectively to minimum and maximum predetermined pressures in the reservoir, said assembly comprising filter unit means connected between the compressor and reservoir for filtering air received from the compressor during the pumping cycle, outlet valve means for passing filtered air from said filter unit means to the reservoir only when said air is at a pressure above said maximum reservoir pressure, and means for reducing to saturation at the pressure in said filter unit means the moisture content of air passed therefrom.

2. A filter assembly according to claim 1, wherein the reducing means includes centrifugal cooling and separating means, and reduces to substantially ambient temperature the temperature of the filtered air passed from the filter unit means, and the outlet valve means prevents backflow of air from the reservoir to the filter means during the idling cycle.

3. A filter assembly for a compressed air system having a reservoir and a compressor responding in pumping and idling cycles respectively to minimum and maximum pressures in the reservoir, said assembly comprising filter unit means connected between the compressor and reservoir for filtering contaminants from air received from the compressor during the pumping cycle, outlet pressure regulator valve means for preventing backflow of air from the reservoir to said filter means and adjustable for regulating above said maximum reservoir pressure the pressure at which filtered air can pass therethrough from said filter unit means to the reservoir during the pumping cycle, and means for reducing to saturation at the pressure in said filter unit means the moisture content of air passed therefrom.

4. A filter assembly according to claim 3, wherein the reducing means includes means for centrifugally cooling and separating moisture from the received air, and including inlet valve means for preventing low pressure hot air from the compressor from entering and heating the filter unit means during the idling cycle.

5. A filter assembly according to claim 4, wherein the inlet valve means is a normally open valve, and the assembly includes a normally closed drain valve openable during the idling cycle for discharging from the filter unit means contaminants filtered from the received air during the pumping cycle, said inlet and drain valves automatically responding to forces applied thereto for simultaneously shifting to and from normal positions thereof and thereby automatically synchronizing filtering and draining cycles of the filter unit means with respectively the pumping and idling cycles of the compressor.

6. A filter assembly according to claim 5, wherein the inlet and drain valves are air-actuated from and spring-returned to normal positions and the actuating air is compressed air.

7. A filter assembly according to claim 5, wherein the filter unit means includes a filter unit, and including a preliminary cooling unit in advance of and heat-insulated from the fluid-connected to said filter unit, and said units cooperate in centrifugally cooling the received air.

8. A filter assembly according to claim 5, wherein the filter unit means includes a filter unit having a housing, an outer canister in a bore of said housing, said outer canister being radially spaced from and defining with a side wall of said housing and an interposed helical rib a downwardly directed helical passage, the reducing means including said passage as means for centrifugally cooling and separating moisture from air passed therethrough during the pumping cycle, an inner canister in and radially spaced from said outer canister and defining therewith an annular passage for passing air from said helical passage upwardly toward the outlet valve means, and a storage chamber in said inner canister for storing during the pumping cycle compressed air operative during the idling cycle for forcing separated contaminants from said said housing through the drain valve on opening thereof.

9. A filter assembly according to claim 8, including a filter element contained in the outer canister above the inner canister for filtering contaminants from air passed thereto through the annular passage, and wherein the compressed air from the storage chamber purges said contaminants by suction from said element on opening of the drain valve.

10. A filter assembly according to claim 9, including a valved passage through the filter element for bypassing said element on clogging thereof and thereupon the storage chamber serves to pass air to said bypass passage.

11. A filter assembly according to claim 5, wherein the compressor has no aftercooler, and the inlet valve has a normally closed exhaust port open during the idling cycle for exhausting hot air from the idling compressor to atmosphere.

12. A filter assembly according to claim 3, wherein the outlet valve means includes a valve body having therein connected adjoining valve and spring chambers, a valve element shiftable between closed and open positions in said valve chamber, a follower adjustably shiftable in said spring chamber, spring means in said spring chamber and acting between said valve element and follower for yieldably resisting in compression opening movement of said valve element, and stop means carried by said follower and engagement with said valve element for limiting said opening movement thereof.

13. A filter assembly according to claim 12, including screw means acting on the follower in opposition to the spring means for adjustably shifting the follower in the spring chamber and thereby regulating the pressure at which the valve element will open to pass filtered air to the reservoir.

14. A filter assembly according to claim 13, wherein the valve and spring chambers extend axially of the valve body and the valve element and follower are shiftable axially of the chambers.

15. A filter assembly according to claim 3, wherein the reducing means includes means for reducing to substantially ambient temperature the temperature of the filtered air passed from the filter unit means.

* * * * *

UNITED STATES PATENT AND TRADEMARK OFFICE
CERTIFICATE OF CORRECTION

PATENT NO. : 4,052,178
DATED : October 4, 1977
INVENTOR(S) : Virgil L. Frantz

It is certified that error appears in the above-identified patent and that said Letters Patent are hereby corrected as shown below:

Column 2, line 27, before "drawings" insert "in the accompanying"; line 46, before "can" insert "air".

Column 3, line 12, cancel "removable" and insert "removably"; line 65, after "pumping" insert "cycle".

Signed and Sealed this

Twenty-first Day of February 1978

[SEAL]

Attest:

RUTH C. MASON
Attesting Officer

LUTRELLE F. PARKER
Acting Commissioner of Patents and Trademarks